(12) United States Patent
Kerschbaum (10) Patent No.: US 9,800,558 B2
(45) Date of Patent: Oct. 24, 2017

(54) FREQUENCY-HIDING ORDER-PRESERVING ENCRYPTION

(71) Applicant: SAP SE, Walldorf (DE)

(72) Inventor: Florian Kerschbaum, Karlsruhe (DE)

(73) Assignee: SAP SE, Walldorf (DE)

( * ) Notice: Subject to any disclaimer, the term of this patent is extended or adjusted under 35 U.S.C. 154(b) by 33 days.

(21) Appl. No.: 14/872,389

(22) Filed: Oct. 1, 2015

(65) Prior Publication Data

US 2017/0099262 A1   Apr. 6, 2017

(51) Int. Cl.
| | |
|---|---|
| *G06F 21/62* | (2013.01) |
| *H04L 29/06* | (2006.01) |
| *G06F 17/30* | (2006.01) |
| *H04L 29/08* | (2006.01) |

(52) U.S. Cl.
CPC .... *H04L 63/0428* (2013.01); *G06F 17/30345* (2013.01); *G06F 17/30625* (2013.01); *G06F 21/6227* (2013.01); *H04L 67/1097* (2013.01)

(58) Field of Classification Search
None
See application file for complete search history.

(56) References Cited

U.S. PATENT DOCUMENTS

| | | | | |
|---|---|---|---|---|
| 5,813,017 | A * | 9/1998 | Morris | G06F 11/1451 |
| 7,426,752 | B2 * | 9/2008 | Agrawal | G06F 21/60 726/26 |
| 7,873,840 | B2 | 1/2011 | Agrawal et al. | |
| 8,291,509 | B2 | 10/2012 | Kerschbaum et al. | |
| 8,639,947 | B2 | 1/2014 | Elovici et al. | |
| 8,806,223 | B2 | 8/2014 | Crowe | |
| 8,817,978 | B2 | 8/2014 | Jho et al. | |
| 8,839,410 | B2 | 9/2014 | Kerschbaum | |

(Continued)

FOREIGN PATENT DOCUMENTS

EP   2876838 A1   5/2015

OTHER PUBLICATIONS

Ispoglou et al.; PArtial ORder PReserving Encryption Search Trees; Aug. 2015; Retrieved from the Internet <URL: http://link.springer.com/chapter/10.1007/978-3-319-22852-5_5>; pp. 1-8 as printed.*

(Continued)

*Primary Examiner* — Saleh Najjar
*Assistant Examiner* — Michael Chao
(74) *Attorney, Agent, or Firm* — Fish & Richardson P.C.

(57) ABSTRACT

Methods, systems, and computer-readable storage media for encrypting data to provide encrypted data for storage in a database. Implementations include actions of receiving, at client-side computing device, an input set including a plaintext value that is to be encrypted to provide an encrypted value, determining whether the plaintext value is stored in a search tree that is stored by the client-side computing device, if the plaintext value is not stored in the search tree, the encrypted value is provided using deterministic encryption of the plaintext value, and if the plaintext value is stored in the search tree, the encrypted value is provided using randomized encryption of the plaintext value, updating the search tree to include a node including the plaintext value and the encrypted value, and transmitting the encrypted value to a server-side computing device for storage of the encrypted value in the database.

20 Claims, 5 Drawing Sheets

(56) References Cited

U.S. PATENT DOCUMENTS

| | | |
|---|---|---|
| 2009/0327748 A1 | 12/2009 | Agrawal et al. |
| 2011/0004607 A1* | 1/2011 | Lokam .............. G06F 17/30675 |
| | | 707/759 |
| 2012/0121080 A1 | 5/2012 | Kerschbaum |
| 2013/0064362 A1 | 3/2013 | Tang et al. |
| 2014/0089678 A1 | 3/2014 | Teranishi |
| 2014/0095860 A1 | 4/2014 | Shikfa et al. |
| 2015/0019879 A1 | 1/2015 | Haerterich et al. |

OTHER PUBLICATIONS

Popa et al.; An Ideal-Security Protocol for Order-Preserving Encoding; 2013; Retrieved from the Internet <URL: http://ieeexplore.ieee.org/xpls/icp.jsp?arnumber=6547127>; pp. 1-15, as printed.*

Reddy et al.; A New Randomized Order Preserving Encryption Scheme; 2014; Retrieved from the Internet <URL: http://research.ijcaonline.org/volume108/number12/pxc3900310.pdf>; pp. 1-6 as printed.*

Popa et al., "An Ideal-Security Protocol for Order-Preserving Encloding", 2013 IEEE Symposium on Security and Privacy, pp. 463-477, IEEE Computer Society, Washington, DC, USA; ISBN: 978-0-7695-4977-4.

Barman et al., "Method to Secure Data in the Cloud while Preserving Summary Statistics", Published 2013, Indian Statistical Institute, 9 pages.

EPO Communication re related EP Application No. 16001942.9-1870; with Extending European Search Report; dated Feb. 10, 2017; 8 pages.

\* cited by examiner

FIG. 5

FREQUENCY-HIDING ORDER-PRESERVING ENCRYPTION

BACKGROUND

Encrypted databases provide data protection (security) in cloud platforms and/or database-as-a-service (DaaS) settings. In encrypted databases, data (plaintext) can be encrypted at the client to provide encrypted data (ciphertext), which can be provided to the database for storage. In some examples, a third-party provides and maintains the database. That is, the database is outsourced to the third-party. For example, a client encrypts data using one or more encryption keys to provide encrypted data, which the client sends to the third-party for storage in the database.

Outsourcing a database offers efficient resource management and low maintenance costs for clients, but exposes outsourced data (client data) to a service provider (the third-party providing the database and its agents). For example, disparate query operations to be executed over encrypted data require varying levels of encryption, some less secure than other. Further, queries executed over the encrypted data can leak information to the third-party (e.g., access patterns) service provider, which can be used in cryptanalysis.

SUMMARY

Implementations of the present disclosure include computer-implemented methods for frequency-hiding order-preserving encryption (OPE) of data to be stored in a database on a server. Implementations include actions of receiving, at client-side computing device, an input set including a plaintext value that is to be encrypted to provide an encrypted value, determining whether the plaintext value is stored in a search tree that is stored by the client-side computing device, if the plaintext value is not stored in the search tree, the encrypted value is provided using deterministic encryption of the plaintext value, and if the plaintext value is stored in the search tree, the encrypted value is provided using randomized encryption of the plaintext value, updating the search tree to include a node including the plaintext value and the encrypted value, and transmitting the encrypted value to a server-side computing device for storage of the encrypted value in the database. Other implementations of this aspect include corresponding systems, apparatus, and computer programs, configured to perform the actions of the methods, encoded on computer storage devices.

These and other implementations can each optionally include one or more of the following features: determining whether the plaintext value is stored in a search tree includes comparing the plaintext value to one or more plaintext values in respective nodes of the search tree, and performing binary traversal of the search tree based on whether the plaintext value is equal to a plaintext value of a respective node; binary traversal of the search tree is performed based on a first coin value requiring traversal in a first direction, and a second coin value requiring traversal in a second direction, coin values being randomly selected; actions further include determining that a threshold depth has been achieved in the search tree, and in response, rebalancing the search tree; actions further include compressing the search tree for storage in the client-side computing device; the plaintext value is encrypted using order-preserving encryption; and actions further include receiving, by the client-side computing device and from the server-side computing device, the encrypted value, traversing the search tree to select the node from a plurality of nodes in the search tree based on the encrypted value, and retrieving the plaintext value from the node.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Implementations of the present disclosure are generally directed to frequency-hiding order preserving encryption (FH-OPE) for encrypting data to be stored in a database on a server. More particularly, implementations of the present disclosure include actions of receiving an input set including a plaintext value that is to be encrypted to provide an encrypted value; determining whether the plaintext value is stored in a search tree that is stored by a client-side computing device, if the plaintext value is not stored in the search tree, the encrypted value is provided using deterministic encryption of the plaintext value, and if the plaintext value is stored in the search tree, the encrypted value is provided using randomized encryption of the plaintext value, and updating the search tree to include a node comprising the plaintext value and the encrypted value. In this manner, the first occurrence of a plaintext value in the search tree results in deterministic OPE encryption of the plaintext value, and a subsequent occurrence of the plaintext value results in randomized OPE encryption of the plaintext value.

OPE enables data to be encrypted, while also enabling efficient range queries on the encrypted data. The performance and functionality of OPE makes OPE suitable for data outsourcing in cloud computing scenarios, for example. However, there remains some question as to the security of OPE. As discussed in further detail herein, the FH-OPE of the present disclosure provides enhanced security over traditional OPE. In accordance with implementations of the present disclosure, and as described in further detail herein, the ciphertexts (encrypted data) are randomized to hide the frequency of plaintexts (unencrypted data). Implementations of the present disclosure include client-side data storage size that is relatively small (e.g., $1/15$ of the plaintext size). Consequently, implementations of the present disclosure enable secure outsourcing of large, encrypted data sets. In some examples, implementations of the present disclosure, provide increased security with larger data sets.

Figure 1:
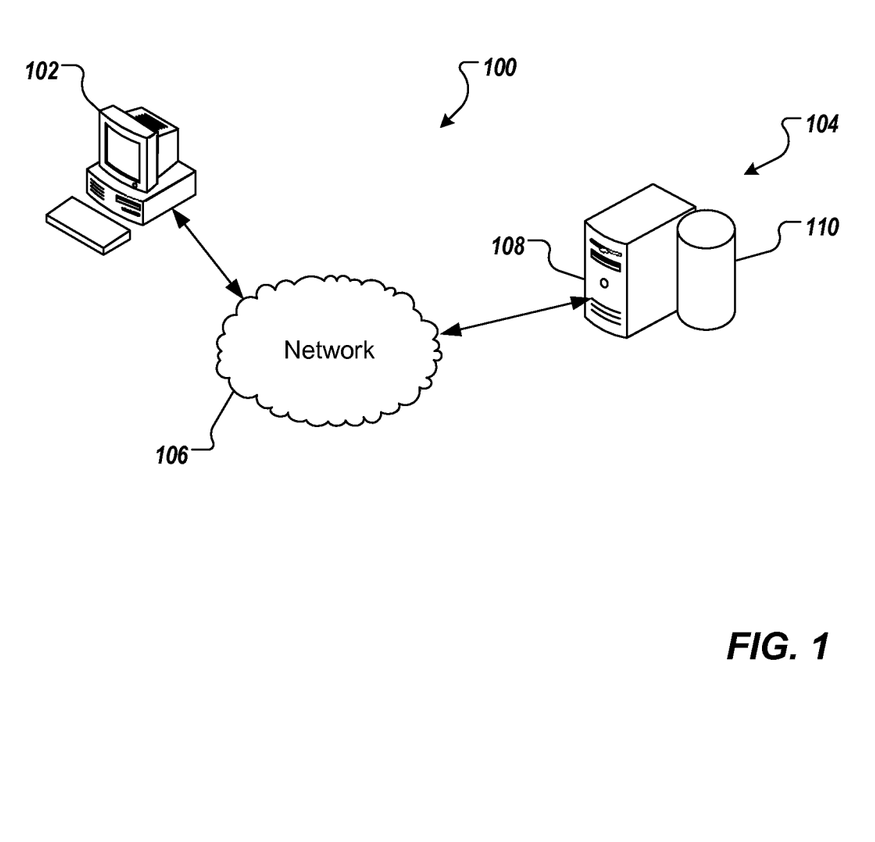
FIG. 1 depicts an example high-level architecture in accordance with implementations of the present disclosure.

FIG. 1 depicts an example high-level architecture 100 in accordance with implementations of the present disclosure. The high-level architecture 100 includes a computing device 102 (e.g., client-side), a server system 104, and a network 106. In some examples, the computing device 102 and the server system 104 communicate over the network 106. In some examples, the computing device 102 can communicate with the server system 104 over one or more networks (e.g., including the network 106). In some examples, the computing device 102 can include any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices.

In some implementations, the server system 104 includes at least one server device 108 and at least one data store 110. In the example of FIG. 1, the server system 104 is intended to represent various forms of servers including, but not limited to a web server, an application server, a proxy server, a network server, and/or a server pool. In general, server systems accept requests for application services and provides such services to any number of client devices (e.g., the computing device 102) over the network 106.

In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In accordance with implementations of the present disclosure, the server system 104 maintains a database that stores encrypted data (e.g., an encrypted database). In some examples, the data (plaintext) is encrypted at the computing device 102 (client-side), and the encrypted data (ciphertext) is sent to the server system 104 over the network 106 for storage. In some implementations, and as described herein, the server system 104 can be provided by a third-party service provider, which stores and provides access to the encrypted data.

In some implementations, a database is part of a database system that also includes a query execution engine. In some examples, the query execution engine receives a query (e.g., a search token from a client), provides a query plan based on the query, executes the query plan to provide a response (e.g., encrypted data from the database that is responsive to the query), and transmits the response to the client (e.g., from which the query was received). In some examples, the query plan includes one or more operations to be performed on the encrypted data.

As introduced above, OPE can be used to encrypt data before outsourcing the data for storage (e.g., storing encrypted data in a database provided by a third-party service provider). For example, OPE enables range queries to be efficiently executed on the encrypted data, which makes OPE attractive for achieving security and privacy in cloud computing. However, the security of traditional OPE is debatable. For example, when encrypting only one plaintext, OPE can be perfectly secure against a ciphertext-only attack. However, when more plaintexts are encrypted, deterministic OPE grows less secure. More particularly, with deterministic OPE, the availability of ciphertexts for all distinct plaintexts can suffer from relatively simple attacks. For example, sorted ciphertexts can be mapped one-to-one to sorted plaintexts. This type of attack can be hard to prevent, because it is enabled by the ordering information that is implicit in the type of encryption. Further, the ordering information is used for efficient search over the encrypted data. This can present a problem, because it is often hard to predict the final size of a data set and the number of distinct plaintexts. Consequently, there is no lower bound on the security of the encryption. In other examples, it is known that all plaintexts in the domain will be encrypted and hence (deterministic) OPE is pointless.

In view of this context, implementations of the present disclosure provide for increasing the security of OPE. More particularly, implementations of the present disclosure provide randomization of the ciphertexts, as described in further detail herein. In some examples, implementations of the present disclosure increase security, while preserving the functionality for queries relying on the ordering information.

In accordance with implementations of the present disclosure, a definition of security of OPE can be provided as indistinguishability under frequency-analyzing ordered chosen plaintext attack (IND-FAOCPA). As discussed in further detail herein, the security captured in this definition increases as the size of the data set increases. The security notion of the present disclosure is stronger than indistinguishability under ordered chosen plaintext attack (IND-OCPA).

As described in further detail herein, implementations of the present disclosure randomize ciphertexts, such that no frequency information leaks from repeated ciphertexts. In some examples, randomized OPE preserves the order of the plaintexts. As also discussed in further detail herein, implementations of the present disclosure reduce the size of client-side storage by approximating the security notion. In some examples, implementations of the present disclosure provide imperfect frequency-hiding, which has enhanced security relative to traditional schemes, but is also acceptable for client-side storage requirements. In some examples, the ciphertexts approximate a uniform distribution, and provide improved security against frequency-analyzing attacks. Implementations of the present disclosure are also indistinguishable under ordered chosen plaintext attack.

To provide additional context for implementations described herein, the development of OPE (including example traditional OPE schemes) is discussed in further detail herein, as well as applications of OPE, and other encryption schemes.

An initial OPE scheme (the "Agrawal OPE scheme") was developed in the database community, based on an assumption that the distribution of the plaintexts is known. The Agrawal OPE scheme is based on a modification of this distribution to match a fixed or randomly chosen distribution. The Agrawal OPE scheme, however, provides no formal security guarantees.

A first formal security guarantee of OPE was provided by the cryptography community, and was provided in an OPE scheme based on the notion of IND-OCPA (the "Boldyreva OPE scheme"). It was shown that no stateless scheme can achieve this notion, and had to settle for an encryption scheme with the weaker security of a random OPE. The Boldyreva OPE scheme requires only storing a key on the client. It was subsequently shown that a random order-preserving function also achieves the security property of window one-wayness. Furthermore, the Boldyreva OPE scheme achieves IND-OCPA security, but requires all plaintexts to be known in advance. Of course, if all plaintexts are known in advances, their order can be determined.

Another OPE scheme was developed (the "Teranishi OPE scheme"), which is stateless (e.g., only requires storing a key on the client). In the Teranishi OPE scheme, random, relatively large gaps were introduced in the ciphertexts to achieve a stronger notion of security than random order-preserving functions of partial-plaintext indistinguishability. However, because the Teranishi OPE scheme is stateless, it does not achieve IND-OCPA security.

An IND-OCPA secure OPE scheme (the "Popa OPE scheme") was subsequently introduced. The Popa OPE scheme is stateful and requires storing information on an OPE server. In the Popa OPE scheme, a multi-round protocol is executed, which results in inefficiency due to network delay. The size of the stored information is linear in the number of distinct plaintexts. Furthermore, the Popa OPE scheme is mutable, whereby the order (and hence half of the ciphertexts) must be updated on almost any encryption operation. This has adverse implications on performance of the database server (e.g., operated in the cloud).

The first efficient IND-OCPA secure order-preserving encryption scheme (the "Kerschbaum OPE scheme") removed the need for a separate server, but also stores information linearly in the number of distinct plaintexts. Furthermore, the Kerschbaum OPE scheme removes the need for a separate server. The Kerschbaum OPE scheme also reduces the probability of mutation to be negligible and reduce the number of rounds in the protocol between client and server to be constant instead of logarithmic in the number of distinct plaintexts. The Kerschbaum OPE scheme has constant encryption cost in the average case.

Each of the above-introduced example OPE schemes are deterministic. Another example OPE scheme introduces some randomization (The "Hildenbrand OPE scheme"). In the Hildebrand OPE scheme, the plaintext domain is divided into disjoint sets and each set is order-preservingly encrypted, but using different, respective keys. However, because the Hildebrand OPE scheme is stateless, it cannot be IND-OCPA secure. The Hildenbrand OPE scheme has significant implications on the necessary rewriting of range queries on encrypted data. Another example OPE scheme (the "Wozniak OPE scheme") adds more randomization, but provides no security guarantee beyond random order-preserving functions.

Example applications of OPE are now discussed to provide further context for implementations of the present disclosure. In general, OPE has many applications. An example application is use with database-as-a-service (DaaS). In DaaS, the database is outsourced to the cloud (e.g., hosted by a third-party service provider), and values stored are encrypted before sent to the cloud. The database performs received queries (e.g., queries from the data owner, who provided the encrypted data) over the encrypted data. OPE enables range queries to be performed over encrypted data without any changes to the database management system. Adjustable encryption for databases has been introduced, which wraps around OPE. Besides databases, OPE has many applications in general cloud software-as-a-service (SaaS) and web applications (e.g., business software, e-mail).

Other example encryption schemes are now discussed to provide further context for implementations of the present disclosure. OPE is a special case of property-preserving encryption. Due to its applications to sorting and searching, the order of values is a particularly useful property to preserve. Searches on encrypted data can also be performed using other encryption schemes employing modified, usually encryption scheme-specific, search algorithms. Such encryption schemes include, for example, searchable encryption, functional encryption, and homomorphic encryption.

In some examples, searchable encryption achieves a stronger notion of security than OPE. Searchable encryption for range queries has also been introduced, which uses a token of range boundaries generated by the secret key to match ciphertexts, which are within the range of this token. Without the token, ciphertexts are indistinguishable under chosen plaintext attack. Yet, searchable encryption schemes require a linear scan of the data, unless additional indexing information is provided. A searchable encryption scheme for ranges with logarithmic time-complexity has been introduced, but its indexing information makes it as vulnerable as traditional OPE, because the proposed sorted tree reveals the order of all elements.

In some examples, searchable encryption is a special case of functional encryption. Functional encryption allows the evaluation of any function on a set of ciphertexts, such that the result of the function is revealed. Recently, functional encryption has been designed for general functions. Specific functions, such as the inner product, have been proposed before. Functional encryption can also reveal only the order while else remaining semantically secure.

Searching can also be implemented using homomorphic encryption, with which the search result remains unknown to the third-party service provider. This implies that, if the result size is unbounded, the entire database needs to be transferred for any query. Further, homomorphic encryption enables the use of arbitrary search functions.

In view of this context, and as introduced above, implementations of the present disclosure provide FN-OPE for use, for example, with an outsourced, property-preserving encrypted database.

As a running example, and to provide further context for implementations of the present disclosure, an Owner has data (e.g., population data) that is to be stored in a database of a third-party service provider (e.g., DaaS paradigm). The Owner encrypts the data using OPE before outsourcing the encrypted data to the cloud. In this example, the database can have the example fields "first name," "last name," "birthday," and "gender,"among others. If the Owner wants to perform a range query over the outsourced, encrypted data, the Owner sends the encrypted boundaries for the search term to the cloud service provider. The service provider performs a regular range query as would be performed on plaintext data using the encrypted boundaries, because the order of the plaintexts is preserved in the encrypted data (ciphertexts). The result is the set of encrypted data values in the queried range, which is returned to the Owner.

The performance and implementation flexibility advantages of OPE are clear. In order for the server (e.g., the server(s) of the third-party service provider) to perform a range query on a set of ciphertexts, the client sends the ciphertexts (encrypted data values) for upper and lower bounds of the range. All ciphertexts included in the range of the encrypted bounds correspond to plaintexts that are in the range. Furthermore, the server can optimize the query using all data structures for plaintext range queries. Hence, such queries can, for example, be effortlessly integrated into existing database management systems.

The Agrawal OPE scheme was designed for the above-discussed scenario, but its security, and its security definition, is not as strong as desired. OPE cannot be as strong as standard encryption, because, by definition, information about the order ("ordering information") is revealed. Some security researchers have shown that this ordering information also necessarily implies partial information about the distance of two plaintexts. Other security researchers have argued that at least half of the bits leak. A complete characterization of the cryptanalytic implications of ordering information is still lacking.

Another security problem of OPE is apparent in databases where each column of a database table is encrypted separately. For example, in a typical database table about people, the fields (e.g., first name, last name, birthdate, gender) are each encrypted with a respective key. This allows queries on each individual field (e.g., all men born on the 4th of July). However, in most of those fields, inputs are not distributed uniformly. For example, the last name Smith is more common in the United States than the last name Huxtable. This information about frequencies of inputs can be used in cryptanalysis of any database table encrypted using OPE. For example, it has been shown that even partial frequency information, as is also the case in searchable encryption, can be used to decrypt entries with high probability. For many fields in a typical database, information about the frequency distribution is readily available (e.g., public web sites list the most common first and last names per region).

This problem can be even more severe. In many fields, for example, there can be many more database rows than values in the plaintext domain (e.g., it is likely that all plaintexts are encrypted at least once). In this case, the security of OPE breaks down. For example, the ordered ciphertexts can simply be matched to the ordered plaintexts. Consider, for example, the field "gender." It is unlikely that many database tables about people contain only men or women. A traditional OPE scheme would reveal the gender, because, lexicographically, "female"<"male."

In view of the above-dicussed context, and deficiencies of traditional OPE, implementations of the present disclosure provide FH-OPE, an OPE scheme that is randomized, such that the frequencies of data values are obfuscated. As described in further detail herein, in accordance with the FH-OPE scheme of the present disclosure, repeated plaintexts will (or can) become different ciphertexts. The FH-OPE scheme of the present disclosure provides a stronger notion of security (e.g., by hiding the frequency of any plaintext). This stronger security is provided along with efficient execution of range queries on plaintext data.

To highlight implementations of the present disclosure, the following example can be considered: when encrypting data consisting of two women and two men, the gender attribute will be encrypted as 1, 2, 3, 4. The first two (1, 2) are each ciphertexts for female and the second two (3, 4) are each ciphertexts for male. The search can still be performed by the server on the encrypted data. When searching for all women, for example, the range [1, 2] is searched (e.g., from the minimum ciphertext of the search term to the maximum ciphertext of the search term). When searching for all men, for example, the range [3, 4] is searched (e.g., from the minimum ciphertext of the search term to the maximum ciphertext of the search term). When searching for the range [female, male], the range [1, 4] is searched (e.g., from the minimum ciphertext of the lower bound to the maximum ciphertext of the upper bound).

Further, the FH-OPE scheme of the present disclosure is secure against ordered chosen plaintext attack, and is stateful. Because the entropy of randomized ciphertexts is much higher than those of deterministic ciphertexts, the FH-OPE scheme of the present disclsoure stores (on the client) more state information than traditional OPE schemes. However, and as described in further detail herein, implementations of the present disclosure employ a number of data compression techniques that reduce the amount of information stored on the client. In some examples, a data compression of a ratio of 15 for realistic data sets, for example, is provided. These type of compression techniques enable practical applications of the FH-OPE scheme of the present disclosure, while improving the security of ciphertexts.

In some examples, a (stateful) order-preserving encryption scheme $\Pi_{FHOPE}$ includes the following example algorithms:

S←KeyGen($\lambda$): Generates a secret state S according to the security parameter $\lambda$.

S', y←Encrypt(S, x): Computes a ciphertext y for plaintext x and updates the state from S to S'.

x←Decrypt(S, y): Computes the plaintext x for ciphertext y based on state S.

An encryption scheme is "correct," if Decrypt(Encrypt(S, x))=x for any valid state S and x. An encryption scheme is "order-preserving," if the order is preserved (i.e., $y_i \geq y_j \Rightarrow x_i \geq x_j$ for any i and j).

The security guarantees of the FH-OPE of the present disclosure are now discussed (e.g., why the FH-OPE is frequency-hiding). The security guarantees begin with the definition of IND-OCPA, which is (so far) the strongest definition of security of OPE. In some examples, IND-OCPA security is defined by a game between a challenger and an adversary. The adversary prepares two sequences of plaintexts where both sequences have the same order and each plaintext is distinct within its sequence. The adversary sends the two sequences to the challenger. The challenger encrypts one sequence and sends the ciphertexts to the adversary who guesses which of the two sequences it is.

In some examples, a simple idea to extend the definition of IND-OCPA to randomized ciphertexts would be to lift the restriction of distinction of plaintexts. Yet, this is insufficient as the following example shows. In case of two distinct plaintexts (e.g., male and female), the only sequences with different frequencies that need to be indistinguishable are those that consists of only one plaintext. All other sequences of the same order have the same frequencies of plaintexts. Consequently, this frequency information may leak from the ciphertexts, because it is present in both plaintext sequences.

However, the random choices of the encryption algorithm cannot be completely independent of the sequence of the plaintexts (as it is the case for indistinguishability under chosen plaintext attack for non-order-preserving encryption), because the order of the plaintext sequences needs to be preserved. In view of this, implementations of the present disclosure provide a randomized order. In some examples, a randomized order is a permutation of the numbers 1,2, . . . , n, which is ordered according to X and ties are broken randomly. The following example definition is provided:

Definition 1: Let n be the number of not necessarily distinct plaintexts in sequence $X=x_1, x_2, \ldots, x_n$ ($\forall i.x_i \in \mathbb{N}$). A randomized order $\Gamma=\gamma_1, \gamma_2, \ldots, \gamma_n$ ($\forall i.1 \leq \gamma_i \leq n$, $\forall i,j.i \neq j \Rightarrow \gamma_i \neq \gamma_j$) of sequence X it holds that
$\forall i,j: x_i > x_j \Rightarrow \gamma_i > \gamma_j$
and
$\forall i,j: \gamma_i > \gamma_j \Rightarrow x_i \geq x_j$ The following example can be considered. Let the plaintext sequence be X=1, 2, 2, 3. Possible randomized orders are $\Gamma_1$=1,3,2,4 and $\Gamma_2$=1,2,3,4. There are many plaintext sequences with randomized order $\Gamma_1$, not all of which have the same plaintext frequencies. Examples with any frequency of 1 are $X'_1$=2,2,2,3, $X'_2$=1,2,1,3, $X'_3$=1,1,1,3 or $X'_4$=1,1,1,1, among many others.

In some examples, the goal of the security definition of the present disclosure is that the ciphertexts only leak the randomized order of the plaintexts. That is, two sequences with the same randomized order, but different plaintext frequencies, should be indistinguishable. It can be noted that the randomized order does not contain any frequency information, because each value always occurs exactly once. The following example security game $Game_{FAOCPA}(\lambda)$ is provided:

The adversary chooses two sequences $X_0$ and $X_1$ of n not necessarily distinct plaintexts, such that they have at least one common randomized order F. The adversary sends the two sequences to the challenger.

The challenger flips an unbiased coin $c \in \{0, 1\}$, executes the key generation $KeyGen(\lambda)$, and encrypts $X_c$ as Y (i.e., $S_i, y_i \leftarrow Encrypt(S_{i-1}, x_i)$). The challenger sends the ciphertexts Y to the adversary.

The adversary outputs a guess c* of c (i.e., which of the two sequences it is).

The security against frequency-analyzing ordered chosen-plaintext attack (FAOCPA) is now defined. The following example definition is provided:

Definition 2: A (stateful) OPE scheme $\Pi_{FHOPE}$ is IND-FAOCPA secure against frequency-analyzing ordered chosen plaintext attack, if the adversary Å's advantage of outputting c in $Game_{FAOCPA}(\lambda)$ is negligible in $\lambda$, which is provided as:

$$Pr[\mathbb{A}(Game_{FAOCPA}(\lambda)) = c] < \frac{1}{2} + \frac{1}{poly(\lambda)}$$

In some examples, IND-FAOCPA security is stronger than IND-OCPA security, because the randomized order of distinct plaintexts is equal to its order. Consequently, IND-FAOCPA implies IND-OCPA, but IND-OCPA does not imply IND-FAOCPA. For example, and as discussed above, the frequency of repeated plaintexts may leak under IND-OCPA, which may be used for cryptanalysis.

Example algorithms for implementing the FH-OPE of the present disclosure are now described in detail. Example algorithms include a tree structure algorithm Tree (Algorithm 1), an encryption algorithm ENCRYPT (Algorithm 2), a decryption algorithm DECRYPT (Algorithm 3), a tree rebalancing algorithm REBALANCE (Algorithm 4), an imperfect frequency-hiding algorithm Imp-FH (Algorithm 5), a randomized order selection algorithm RO-Select (Algorithm 6), and a programmed random oracle for RANDOMCOIN algorithm RandomOracle (Algorithm 7).

Implementations of the present disclosure insert plaintexts into a sorted binary tree in the order that they are encrypted. In accordance with implementations of the present disclosure, a binary search tree with dynamically allocated leaves and pointers is provided. As discussed in further detail herein, the search tree is compressed to save space, as compared to storing all plaintexts on the client.

It can be noted that, although the search tree is dynamic, there is a threshold depth, beyond which the search tree is rebalanced. In some examples, the threshold depth is determined based on the ciphertext length. In some examples, the threshold depth may be exceeded (e.g., in cases of ordering of plaintexts to encrypt). In some examples, the probability of exceeding this ciphertext length is negligible in the case of uniformly distributed input.

In some implementations, each plaintext is encrypted as the mean value of the ciphertexts for the next plaintext just smaller and greater. The plaintext, ciphertext pair is inserted into the search tree. In some examples, all plaintexts that have already been encrypted are handled differently. In this case, (i.e., when inserted plaintext and to be encrypted plaintext are equal), the search tree is traversed in a randomly chosen fashion, and the new plaintext is inserted as a leaf. The basic data structure of the search tree is described in further detail herein with reference to Algorithm 1 below:

| Algorithm 1: Tree Structure |
| --- |
| Struct Tree { <br>     Tree left; <br>     Tree right; <br>     bitstring<k> plain; <br>     bitstring<l> cipher; <br> } |

In some implementations, the following example parameters are fixed for each of the algorithms: n is the number of not necessarily distinct plaintexts to be inserted, and N is the number of distinct plaintexts. Consequently, the bitlength is $k=[\log_2 N]$ in Algorithm 1. $\lambda$ is the security parameter and the expansion factor of the ciphertext. Consequently, $l=\lambda k$ in Algorithm 1. In some examples, the security parameter can also be used to determine the length of the seed for pseudo-randomness. In some examples, this seed is much longer than the expansion factor.

In some examples, the binary search tree (the state) is denoted as a set T of nodes {t}. In some examples, inputs t are added for the current node and min and max are added for the lower and upper limit in order to enable recursion. Encryption of the plaintext is executed in accordance with Algorithm 2:

| Algorithm 2: Encryption |
| --- |
| Input: x, t, min, max <br> Output: y <br> State: Sorted binary tree T of nodes {t} <br> Initialization: T is empty <br>   1.  If x = t.plain, then coin = RANDOMCOIN( ) $\in$ {0,1}, <br>        else coin = $\perp$ <br>   2.  If x > t.plain or coin = 1, then <br>   3a. If t.right ≠ null, then <br>   4.  Return ENCRYPT(x, t.right, t.cipher, max) <br>   3b. Else <br>   5.  If max − t.cipher < 2, then return REBALANCE(x, −1, n) |

-continued

Algorithm 2: Encryption

6. Insert t.right = new Tree $\left(x, \text{t.cipher} + \left\lceil \frac{\max - \text{t.cipher}}{2} \right\rceil\right)$ and return t.right.cipher.

3c. EndIf
7. If x < t.plain or coin = 0, then
8a. If t.left ≠ null, then
9. Return ENCRYPT(x, t.left, min, t.cipher)
8b. Else
10. If t.cipher − min < 2, then return REBALANCE(x, −1, $2^{\lambda \log 2n}$)

11. Insert t.left = Tree$\left(x, \min + \left\lceil \frac{\text{t.cipher} - \min}{2} \right\rceil\right)$ and return t.left.cipher.

8c. EndIf

In some implementations, the function is initially called with the plaintext x to be encrypted, the root of the tree T, min=−1 and max=$2^{\lambda \cdot \log_2 n}$. In some examples, a new root is created, if none exists. In some examples, if n is unknown, it is estimated. This initial call can be denoted as ENCRYPT(X) leaving out the state S from the definition of a frequency-hiding order-preserving encryption scheme $\Pi_{FHOPE}$. In some examples, the probability of rebalancing is negligible in n for uniform inputs, if λ>6.4.

An example of encryption is the plaintext sequence X=1, 2,1,3 with min=−1 and max=128. In this example, the first two plaintexts are, for example, deterministically $y_1$=64 and $y_2$=96, respectively. The ciphertext for the third plaintext $x_3$=1 is randomized, because it is a repeated plaintext. The ciphertext could be, for example, either $y_3$=32 or $y_3$=80 (e.g., depending on the random coin). The fourth ciphertext is also deterministic $y_4$=112, for example. In some implementations, the function RANDOMCOIN draws uniformly distributed random coins from a keyed pseudo-random function.

In some implementations, decryption is performed by traversing the search tree to find the matching ciphertext. In some examples. A decryption call DECRYPT(X) forwards to DECRYPT(x, root(T)). Decryption of the ciphertext is executed in accordance with Algorithm 3:

Algorithm 3: Decryption

Input: y, t
Output: x
State: Sorted binary tree T of nodes {t}
1. If y > t.cipher, then return DECRYPT(y,t.right)
2. If y < t.cipher, then return DECRYPT(y,t.left)
3. Return t.plain As discussed above, the search tree can be rebalanced in certan circumstances. In some examples, rebalancing of the search tree is performed in accordance with Algorithm 4:

Algorithm 4: Rebalancing

Input: x, min, max
Output: y
State: Sorted binary tree T of nodes {t}
1. Let X = {t.plain} ∪ {x}
2. Sort X in ascending order 3. Let T = $\left\{ \text{New Tree}\left(x_{\lceil |x|/2 \rceil}, \min + \left\lceil \frac{\max - \min}{2} \right\rceil\right) \right\}$ Algorithm 4: Rebalancing 4. Let y = T.plain
5. Let X' = {$x_j | x_j < y$}
6. Let X'' = {$x_j | x_j < y$}

7. Let y' = Encrypt$\left(x_{\lceil |x'|/2 \rceil}, T_0, \min, \max\right)$

8. Let y'' = Encrypt$\left(x_{\lceil |x''|/2 \rceil}, T_0, \min, \max\right)$

Figure 2A:
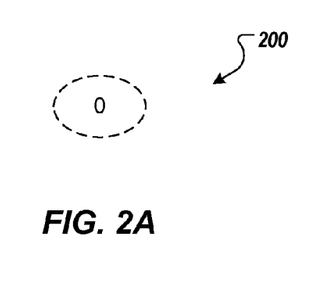
FIGS. 2A-2D depict an example progression for providing a search tree in accordance with implementations of the present disclosure.
Figure 2B:
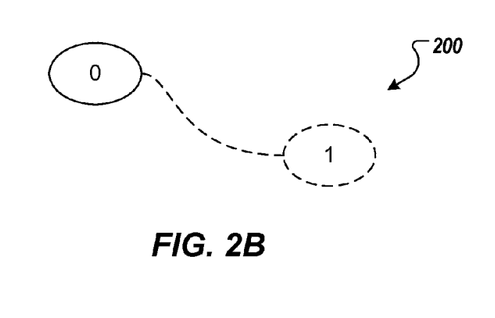
Figure 2C:
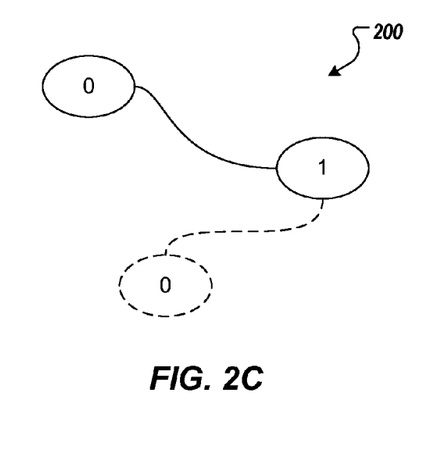
Figure 2D:
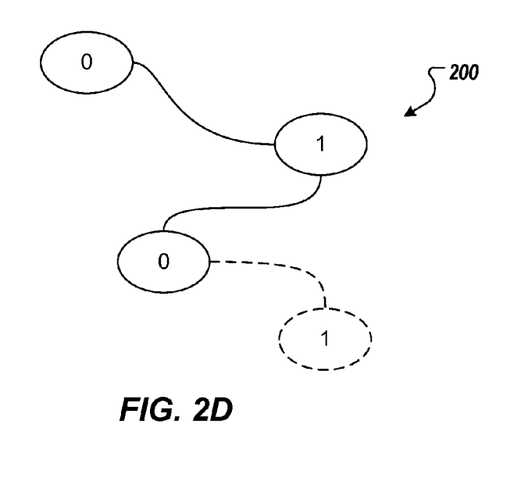

9. Recursively iterate on line 5 with both y' and y'' as y and X' and X'' as X, respectively.
10. Find x in T and return $T_x$.cipher With reference to FIGS. 2A-2D, and before describing space-saving measures (compression), examples of trees that can emerge when inserting random plaintexts will be discussed. The discussion is based on the example of a binary plaintext domain (e.g., male and female) introduced above. In this example, four plaintexts are provided $x_i \in \{0, 1\}$. The following example sequence X=0,1,0,1 is provided. The random coins are set to the sequence 1, 0, and the resulting tree sequence is depicted in FIGS. 2A-2D. Each of FIGS. 2A-2D depicts a search tree 200 after inserting one more elements of the sequence with a new node indicated in phantom (dashed line). In FIG. 2A, the search tree is initialized. Conseuqently, a new node (root) is added for te first plaintext value that is to be encrypted (e.g., 0). In FIG. 2B, when inserting 1 for the first time, a new node (leaf) is added. In FIG. 2C, a plaintext is repeated (e.g., 0), but is inserted beneath a parent with a different plaintext (e.g., 1). This can be traced as follows: when inserting 0 for the second time, a 0 is encountered at the root; based on the random coins, traversal is to the right, where a 1 is encountered; a deterministic choice results in the new node (leaf). In FIG. 2D, the next 1 is inserted and plaintext nodes interleave. In larger plaintext domains, even intermediate elements can be placed at lower nodes.

Figure 3:
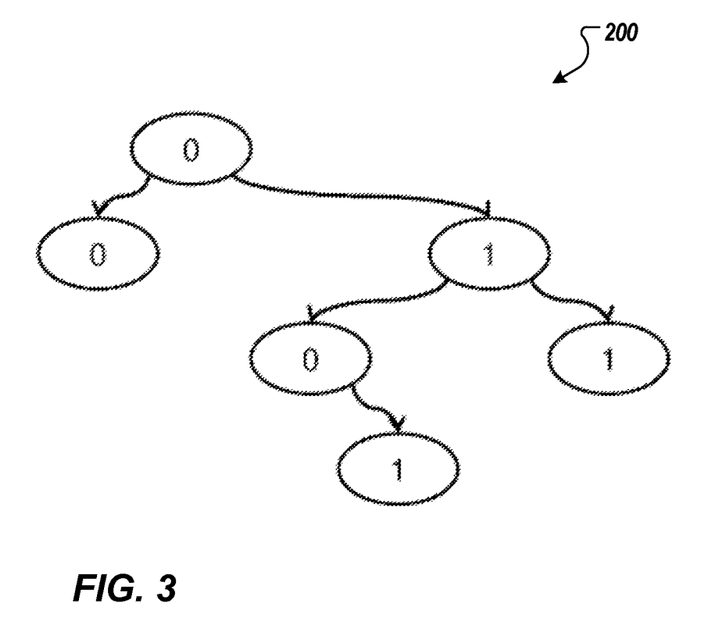
FIG. 3 depicts an example search tree for an example sequence in accordance with implementations of the present disclosure.

In some examples, repeated plaintexts can be placed under parents with the same plaintext. If, for example, two more elements 0,1 are inserted with random coins 0,1, the search tree 200 will be as depicted in FIG. 3.

In some implementations, when storing the plaintexts in the search tree more storage space (i.e., computer-readable memory) is needed than when storing only the plaintexts. For example, in accordance with the present disclosure, the ciphertext and the pointers are also accommodated in the search tree. In view of this, compression of the search tree is provided. In some examples, the ciphertext does not need to be stored, but can be computed dynamically, as the search tree is traversed.

In some implementations, the plaintext can be compressed using dictionary compression, and repeated values can be stored as the index into the dictionary. This can be very effective in saving space for column-store databases, for example. In some examples, subtrees of repeated values can be can be compressed. As discussed above, repeated plaintexts can have parent nodes of the same or a different plaintexts. In some examples, subtrees of the same plaintext can be referred to as clusters. Within a cluster, the plaintext for each node need not be stored. Instead, the plaintext is stored once in the root node of the cluster.

In some implementations, while suppressing a field in a structure is supported in polymorphic object-oriented languages using inheritance, the search tree can be further compressed. In some examples, instead of storing the tree structure, only its traversal is stored thereby compressing the size of the pointers. For example, the size of a cluster can be provided as M, the search tree is traversed in post-order traversal order, and the nodes are assigned the numbers from 1 to M in ascending order (i.e., the post-order traversal is now 1,2,3, . . . ). The search tree is traversed in in-order traversal order, and the post-order-traversal numbers are recorded. As an example, a simple binary tree with one root and two leaves becomes 1,3,2. In some examples, only store the traversal sequence is stored. Each time a cluster is encountered, the cluster is expanded to the full search tree before proceeding in the traversal. In some examples, this can be done in linear time and space. After proceeding to the next node with different plaintext, the temporarily expanded search tree can be deleted. In this manner, savings is provided for both the plaintext and the pointer information in the search tree. For example, only the (long) pointers between nodes of different plaintexts need be stored.

Implementations of the FH-OPE of the present disclosure achieve IND-FAOCPA security. IND-FAOCPA security has security advantages, but also relatively high storage space requirements at the client. In some application scenarios, lower security and (significantly) lower storage space requirements can be preferred. For example, it is often enough if the distribution of ciphertexts is not perfectly hidden, but approaches a known distribution (e.g., a uniform distribution). In accordance with implementations of the present disclosure, a uniform distribution of repeated ciphertexts can be approximated using the FH-OPE scheme and a heuristic pre-filter.

In some implementations, for each distinct plaintext $x \in X$, the numbers $c_x$ of occurrences and the numbers $d_x$ of distinct ciphertexts (for each plaintext) are determined. In some examples, $C = \{c_x | x \in X\}$ and $D = \{d_x | x \in X\}$ are the set of all respective counters. In some examples, the pre-filter is parameterized by $r > 1$ and $0 \leq p \leq 1$. An expected deviation from the uniform distribution is detected by more than a factor of r, and even if there is no deviation a new random ciphertext can be created with probability p. In some examples, the pre-filter is provided in accordance with Algorithm 5:

---

Algorithm 5: Filtering for Imperfect Frequency-Hiding

Input: C, D, r, p, x
Output: y
State: T = {$t_j$} in a sorted binary tree
1. Let $c_x$ be the number of occurrences of plaintext x.
 Let $d_x$ be the number of distinct ciphertexts for x.
2. If $\dfrac{c_x + 1}{d_x} > r \dfrac{\sum_{j \in X} c_j}{\sum_{j \in X} d_j}$
 then increment $c_x$, $d_x$ and return y = ENCRYPT(x).
3. Choose a random coin $c \in \{0,1\}$ with Pr[c = 1] = p.
4. If c = 1, then increment $c_x$, $d_x$ and return y = ENCRYPT(x).
5. Build set Y = {$t_j$.cipher|$t_j$.plain = x}.
 Uniformly select y among Y, increment $c_x$ and return y.

---

In some examples, the parameter r bounds the deviation from the uniform distribution, and the parameter p balances storage cost and security. For p=1, the result of the filtered scheme is the same as the perfectly frequency-hiding order-preserving encryption scheme. For p=0 and a uniform distribution of plaintexts, the filtered scheme grows near the deterministic encryption of the Kerschbaum OPE scheme. Nevertheless, for skewed plaintext distributions (and finite r), implementations of the present disclosure approximate a uniform distribution and is, consequently, more secure.

It can be noted that the above-discussed filtered FH-OPE scheme is still IND-OCPA secure in the worst case. Consequently, it is more secure than many other OPE schemes.

Figure 4:
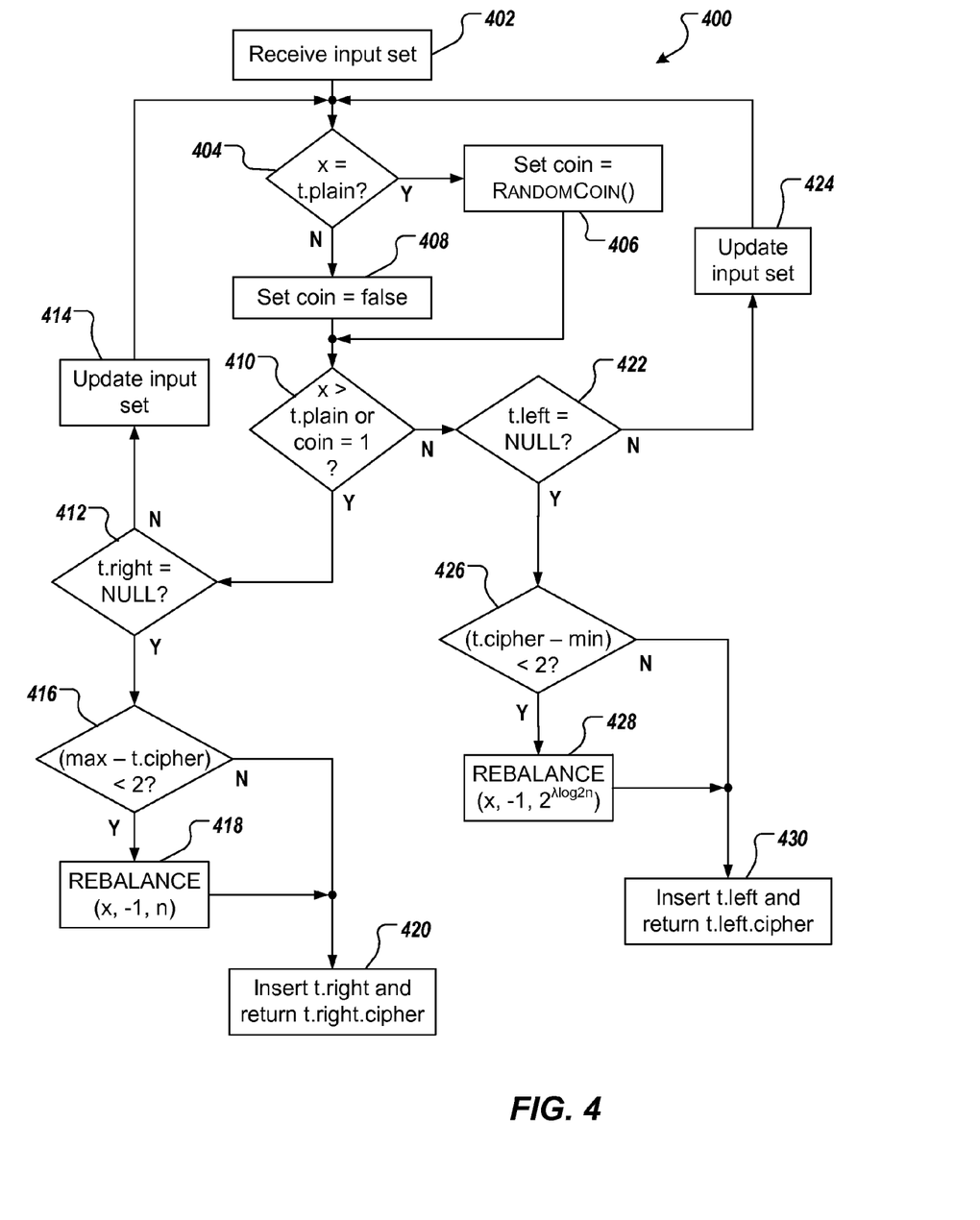
FIG. 4 depicts an example process that can be executed in accordance with implementations of the present disclosure.

FIG. 4 depicts an example process 400 that can be executed in accordance with implementations of the present disclosure. In some examples, the example process 400 can be provided as one or more computer-executable programs executed using one or more computing devices. In some implementations, the example process 400 is executed to provide encryption of plaintext values in accordance with implementations of FH-OPE the present disclosure.

In some implementations, the process 400 of FIG. 4 is performed for each plaintext value x in a set of plaintext values X. In some examples, the set of plaintext values X are to be encrypted before being sent for storage in a database provided by a third-party service provider. For example, the set of plaintext values X can include confidential data of an entity (e.g., business, hospital). In some examples, the plaintext values in the set of plaintext values X are provided as numerical values (e.g., integers, decimals), which can be compared to one another and/or other numerical values (e.g., greater than, less than, equal to). In some examples, the plaintext values in the set of plaintext values X are initially provided as string values (e.g., text). In some examples, string values are converted to numerical values, such that the plaintext values in the set of plaintext values X can be compared to one another and/or other numerical values (e.g., greater than, less than, equal to).

In some examples, the process 400 of FIG. 4 begins with a search tree already having a root node therein. That is, for example, at least one plaintext value x in a set of plaintext values X has been encrypted and at least one node (e.g., root node) is included in the search tree. In some examples, if the search tree is empty, the root node is created, the plaintext value x is encrypted, and the plaintext value x and the encrypted value y are stored in the root node.

An input set, which includes a plaintext value x, a currently considered node t, a min value, and a max value, is received (402). For example, the plaintext value x is the next plaintext value in the set of plaintext values X. An example min value is −1, and an example max value is $2^{\lambda \cdot \log_2 n}$ (e.g., 128). It is determined whether the plaintext value x is equal to a plaintext value in the currently considered node t (t.plain) (404). In some examples, the currently considered node t is initially set to the root node. If the plaintext value x is equal to t.plain, a coin value (coin) is determined based on RANDOMCOIN (406). For example, RANDOMCOIN is executed to set coin equal to 0 or 1. Accordingly, if the plaintext value x is equal to t.plain, the plaintext value x is not unique (e.g., has already been encountered in the set of plaintext values X), and randomized encryption is conducted based on coin, as described in detail herein. If the plaintext value x is not equal to t.plain, coin is set equal to false (408). Accordingly, if the plaintext value x is not equal to t.plain, the plaintext value x is unique (e.g., at least relative to the currently considered node t), and deterministic encryption is conducted, as described in detail herein.

It is determined whether the plaintext value x is greater than t.plain, or whether coin is equal to 1 (410). If the plaintext value x is greater than t.plain, or coin is equal to 1, traversal through the search tree is to the right, and it is determined whether a child node already exists to the right of the currently considered node t (e.g., whether t.right=NULL) (412). If t.right is not equal to NULL (i.e., a child node already exists to the right), the input set is updated to include the plaintext value x, the next node t.right as the currently considered node t, t.cipher of the next node t.right as the min value, and the max value (414), and the example process 400 loops back. If t.right is equal to NULL (i.e., a child node does not already exist to the right), it is determined whether the threshold depth of the search tree has been achieved (e.g., whether a difference between the max value and t.cipher of the currently considered node t is less than 2) (416). If the threshold depth has been achieved, the search tree is rebalanced (e.g., based on Algorithm 4, described herein) (418) to provide an updated search tree, and the plaintext value x and its cipher text t.right.cipher are inserted as a new node t.right into the updated search tree (420). If the threshold depth has not been achieved, the plaintext value x and its cipher text t.right.cipher are inserted as a new node t.right into the search tree (420).

As discussed above, it is determined whether the plaintext value x is greater than t.plain, or whether coin is equal to 1 (410). If the plaintext value x is not greater than t.plain, and/or coin is equal to 0, traversal through the search tree is to the left, and it is determined whether a child node already exists to the left of the currently considered node t (e.g., whether t.left=NULL) (422). If t.left is not equal to NULL (i.e., a child node already exists to the left), the input set is updated to include the plaintext value x, the next node t.left as the currently considered node t, the min value, and t.cipher of the node t.left as, and the max value (424), and the example process 400 loops back. If t.left is equal to NULL (i.e., a child node does not already exist to the left), it is determined whether the threshold depth of the search tree has been achieved (e.g., whether a difference between t.cipher of the currently considered node t and the min value is less than 2) (426). If the threshold depth has been achieved, the search tree is rebalanced (e.g., based on Algorithm 4, described herein) (428) to provide an updated search tree, and the plaintext value x and its cipher text t.left.cipher are inserted as a new node t.left into the updated search tree (430). If the threshold depth has not been achieved, the plaintext value x and its cipher text t.left.cipher are inserted as a new node t.left into the search tree (430).

If additional data is to be encrypted, the process 400 can be repeated for the next plaintext value x in the set of plaintext values X.

Implementations of the FH-OPE scheme of the present disclosure were evaluated in Java 1.7, and were run in the 64-Bit Hotspot Server VM on an Intel Core i5-4300 CPU with 1.9-2.5 GHz and 16 GB RAM. A series of example analyses were performed, and are summarized below.

A proof of security of the FH-OPE of the present disclosure against FAOCPA is discussed above. This proof can be evaluated by constructing a simulator of the FH-OPE scheme that produces identical outputs for each of the two challenge sequences of the proof. Consequently, the computational indistinguishability stems from implementing the random source as a pseudo-random function, and not any other hardness assumption. A series of theorems and corresponding proofs are outlined below.

Theorem 1: The FH-OPE scheme of the present disclosure is secure against FAOCPA.

Proof: An example simulator proceeds as follows—the adversary sends the two plaintext sequences $X_0$ and $X_1$ of length n; the simulator randomly selects a randomized order common to $X_0$ and $X_1$ from the set of all common randomized orders. This can be done using the following example algorithm:

---
Algorithm 6: Selecting A Randomized Order

Input: $X_0, X_1$, s.t. $|X_0| = |X_1| = n$
Output: Γ
1. Sort $X_0$ and $X_1$ in ascending order into $Z_0$ and $Z_1$, respectively.
2. Build a list W of triples⟨$z_{0,i}, z_{1,i}, i$⟩.
3a. For each pair $x_{0,j}, x_{1,j}$ for $1 \leq j \leq n$ do:
4. Build set $U = \{i | \langle z_{0,i}, z_{1,i}, i \rangle \in W \wedge z_{0,i} = x_{0,j} \wedge z_{1,i} = x_{1,j}\}$.
5. Uniformly select $y_j$ in U.
6. Remove⟨$x_{0,j}, x_{1,j}, y_j$⟩ from W.
3b. End for each
---

Theorem 2: Algorithm 6 runs in time $O(n^2)$.

Proof: The loop (from line 3a to 3b) iterates n times. Each operation (lines 4, 5, and 6) takes at most n operations on the set W or U, respectively. Consequently, the overall time is bound by $O(n^2)$ operations.

In some examples, Theorem 2 implies that the example simulator is polynomial time, and computational indistinguishability is feasible, even if the random choices are implemented using a pseudo-random function. In some examples, once the randomized order F has been selected, the simulator needs to compute the ciphertexts. The simulator simulates the RANDOMCOIN function in Algorithm 5 using a simulator of the random source (e.g., the random source could be replaced by hash functions (a random oracle)).

In some examples, the simulator uniformly randomly selects plaintext sequence X∈ $\{X_0, X_1\}$. During encryption, as it stores plaintexts in the state S—the binary search tree T—of the encryption function, it keeps track of the randomized order values $\gamma_i$. As it encrypts $x_i$ and finally stores $x_i$ in T, it also stores $\gamma_i$, i.e. for each value v in the tree T we also know $\gamma_v$. In some examples, $\gamma_i$ denotes the randomized order value of the current input plaintext $x_i$, and $\gamma_v$ denotes the randomized order value of the current node in the tree traversal. If, during encryption of $x_i$, the simulator encounters a call to RANDOMCOIN, it calls Algorithm 7 (below) with $\gamma_i$ and $\gamma_v$ instead:

---
Algorithm 7: Programmed Random Oracle for RANDOMCOIN

Input: $y_i, y_v$
Output: 0 or 1
1. If $y_i > y_v$, then return 1.
2. Return 0.
---

Theorem 3: The output of Algorithm 7 in the simulator is indistinguishable from uniform random coins.

Proof: While the output of Algorithm 7 is deterministic, the choice of $\gamma_i$ and $\gamma_v$ is determined by Algorithm 6. Algorithm 6 uniformly selects a randomized order among all possible randomized orders. Because each randomized order results in a different binary search tree, and each output of the RANDOMCOIN function also produces a different binary search tree, the output of Algorithm 7 is indistinguishable from uniform random coins.

In some examples, the example simulator produces the same output for both sequences, runs in polynomial time, and its random output is indistinguishable from uniform random coins. Consequently, the probability that the adversary wins Game$_{FAOCPA}(\lambda)$ against the FH-OPE of the present disclosure is negligible in λ larger than ½.

In some implementations, the effectiveness of the two different security models—IND-OCPA and IND-FAOCPA—can be estimated by estimating the size of the set of indistinguishable plaintext sequences. Two indistinguishable sequences can be given as a challenge in the security game, and result in an indistinguishable ciphertext challenge. Clearly, the larger the set of sequences indistinguishable from a given one, the more secure the encryption. Under standard IND-CPA security any two sequences of plaintexts are indistinguishable.

An OPE scheme that is IND-OCPA secure may leak the order of the plaintext sequence. Note that IND-OCPA security is also an upper bound for weaker OPE schemes. The number of indistinguishable sequences is provided below in Theorem 4.

Theorem 4: Let D be the number of distinct plaintexts in the plaintext domain. For any sequence of N distinct plaintexts there are $$\binom{D}{N}$$

indistinguishable sequences under IND-OCPA.

Proof: The order of a sequence of N distinct plaintexts is a subset of the domain. There are $$\binom{D}{N}$$

possible subsets, and consequently, as many indistinguishable sequences.

In some examples, an IND-FAOCPA secure scheme leaks the randomized order of the plaintext sequence. Consequently, an indistinguishable sequence must have at least one common randomized order. Different sequences may have different numbers of indistinguishable sequences. Consider encrypting two distinct plaintexts 0 and 1 ("female" and "male"). The sequence $X_0$=0,0 has 4 indistinguishable sequences (including itself), but the sequence $X_1$=0,1 has only 3. Consequently, the expected number of indistinguishable sequences can only be estimated. A lower bound of the expected number of indistinguishable sequences is provided below in Theorem 5:

Theorem 7: Let D be the number of distinct plaintexts in the plaintext domain. For a uniformly chosen plaintext sequence of size n with N distinct plaintexts there are at least $$N(D-1)^{\frac{n}{N}}$$

indistinguishable sequences expected.

Proof: For any set $\tilde{X}$ of unique plaintext x the sub-sequence $x_i$<x can be flattned to 1, and the sub-sequence $x_j$>x can be flattened to D. In this case, there are D−1 additional choices for any element (without counting doubles) and an expected number of n/N such elements. The order of choices within its repetitions is independent, because all are from the same plaintext, and there N such sets $\tilde{X}$. Consequently, there are at least $$N(D-1)^{\frac{n}{N}}$$

expected indistinguishable sequences.

It can be emphasized that the expected number of distinct plaintexts is $$E[N] = D\left(1 - \left(\frac{D-1}{D}\right)^n\right).$$

This number approaches D as n grows. Consequently, the number of indistinguishable sequences under IND-OCPA approaches 1 as n grows. To the contrary, either n/N or N (N≤n) approaches infinity as n grows. Consequently, the number of indistinguishable sequences under IND-FAOCPA also approaches infinity as n grows.

In some implementations, encryption that is secure against IND-FAOCPA remains secure (even increases security) for long sequences, whereas the security of encryption secure against (only) IND-OCPA deteriorates. Consequently, the encryption of long (and growing) sequences of plaintexts is more secure under an IND-FAOCPA secure scheme than under a scheme that is only IND-OCPA secure.

In some examples, each OPE scheme—deterministic or randomized—can be described as a monotonically increasing function. Consequently, a simple statistical cryptanalysis technique is to model the encryption as a linear function. Given two plaintext, ciphertext pairs, the parameters of this function can be estimated.

In some examples, the effectiveness of this attack can be estimated by measuring the correlation between the ciphertext and plaintext. For a set of plaintext, ciphertext pairs, the Pearson correlation coefficient r can be determined. The Pearson correlation coefficient measures a linear relation between two sets of random variables.

In an example, n=16384 (possibly repeated) plaintexts are independently encrypted and are uniformly chosen from a set of N∈ {64,256,1024, 4096,16384,65536} distinct plaintexts. In this example, the ciphertext space is set to 60 bits, 100 experimental runs are performed, and the correlation coefficient r' is determined. The 90% confidence interval is also determined.

For purposes of analysis, the FH-OPE of the present disclosure can be compared to the deterministic Kerschbaum OPE scheme discussed above. The Kerschbaum OPE scheme is IND-OCPA secure. In this example analysis, the same parameters for n and N are used, but two different options are considered for the ciphertext length. In one case, the expansion factor λ=5 is fixed to the same value (i.e., the ciphertext length is 5 $\log_2$ N−10 bits). In another case, the ciphertext length is fixed at 60 bits. The result of this example analysis includes an overlap in the confidence intervals for the different data series. Consequently, it can be concluded that FH-OPE scheme of the present disclosure is no weaker under IND-OCPA, than the Kerschbaum OPE scheme.

As introduced above, client-side storage space is a limiting resource for FH-OPE. To analyze this, experimental data sets were encrypted and the storage consumption of client data structures were measured.

In this example analysis a database table with all people in Germany was encrypted. The German population is roughly n=8×10$^7$. The fields "first name", "last name", "birthdate," and "gender" were encrypted. The distribution of those fields were estimated using public information (e.g., http://de.wikipedia.org/wiki/Familienname http://www.beliebte-vornamen.de/lexikon). In this example analysis, 20 test runs were performed, and the average storage size was determined. In some examples, the extent of the 90% confidence is always below 0.05% of the measured value. In none of the experimental runs, was the search tree rebalanced. The results of this experimental analysis are summarized in Table 1 below:

TABLE 1

Compression Effect on Database Table of People in Germany

| Field | N | Field Size (byte) | Plaintext Size (Mbyte) | Compressed Size (Mbyte) | Compression Ratio |
|---|---|---|---|---|---|
| First Name | 10000 | 49 | 3738.4 | 106.1 | 35.2 |
| Last Name | 1000000 | 50 | 3814.7 | 104.8 | 36.4 |
| Birthdate | 40000 | 4 | 305.2 | 90.4 | 3.4 |
| Gender | 2 | 1 | 76.3 | 232.4 | 0.3 |
| Total | | 104 | 7934.6 | 533.8 | 14.9 |

Overall, a compression ratio of almost 15 was achieved. This may suffice for small to medium databases with most clients. It is also seen that compression performs better for larger field sizes (e.g., first name, last name). Dictionary compression performs better for these fields than for small fields. In fact, for small field sizes—as in the gender attribute—the compression techniques may even increase the storage space.

Further, the effectiveness of search tree compression by itself was measured. In the example analysis, already dictionary compressed values are considered (e.g., field size is equal to $[\log_2 N]$ bytes, and the size of the search tree was measured, as described herein. In this example analysis, n∈ $\{10^5, 10^6, 10^7\}$ plaintexts were encrypted uniformly and chosen among N∈ $\{16, 256, 4096, 65536, 1048576\}$ distinct plaintexts, and 20 test runs were performed, and the average storage size was determined. The extent of the 90% confidence interval is always below 0.1% of the measured size. In none of the experimental runs was the search tree rebalanced. The results show that search tree compression performs up to a compression ratio of roughly 2 around the center number of distinct plaintexts (N~√n). It can be concluded that, for suitable plaintext domains, the compression technique performs well, but for others, different techniques may provide better performance.

In view of this, imperfect FH-OPE, described above, was also evaluated. In this example analysis, a plaintext domain of N=2 was used, because the overall compression performed worst with this parameter. In this example analysis, n=$10^6$ plaintexts were encrypted with probability Pr[x=1]∈ $\{0.5, 0.6, 0.7, 0.8, 0.9\}$, and skewed distributions were considered. The parameter r=1.025 is fixed (i.e., the deviation from the expected number of repetitions is bound to 2.5%), and the parameter p ranged over $\{0, 0.025\%, 0.05\%, 0.075\%, 0.1\%\}$. In this example analysis, 20 test runs were performed, and the average number e of distinct plaintexts was determined. It can be noted that, without pre-filtering in the previous experiments discussed above, the average number of distinct plaintexts is n. Consequently, an additional compression of n/e is achieved using pre-filtering. The extent of the 90% confidence interval is always below 9.5% of the measured number. The results show that the number of distinct ciphertexts approximately grows linear with the parameter p, and that the plaintext distribution (i.e., the probability of x=1), has minor influence on the number of distinct ciphertexts. Furthermore, compression is very effective. In this example analysis, a compression ratio of over 17000 was achieved for p=0, and was still over 900 for p=0.1%.

Another example analysis was performed to evaluate the impact of the parameter r. In this example analysis, n=$10^6$ and Pr[x=1]∈ $\{0.5, 0.6, 0.7, 0.8, 0.9\}$. The parameter p=0.05% (i.e., the probability of choosing a new ciphertext without equalizing the distribution is 0.05%). Consequently, at least 500 distinct ciphertexts were expected. In this example analysis, 20 test runs were performed, and the average number e of distinct plaintexts was determined. The extent of the 90% confidence interval is always below 16.6% of the measured number. The results show that the number of distinct ciphertexts is slightly above 500 due to the variance in the input distribution. Yet, the number approaches 500 as the parameter r increases, because more variance is tolerated. Again, the compression is very effective, a compression ratio roughly between 1700 (r=1.025) and 1900 (r=1.1) having been achieved.

In view of the example analyses, it can be concluded that, for plaintexts which are not amenable to standard compression techniques, and/or for very large databases with resource-constrained clients, imperfect FH-OPE of the present disclosure can be used to provide suitable performance (e.g., practical client-side storage).

Figure 5:
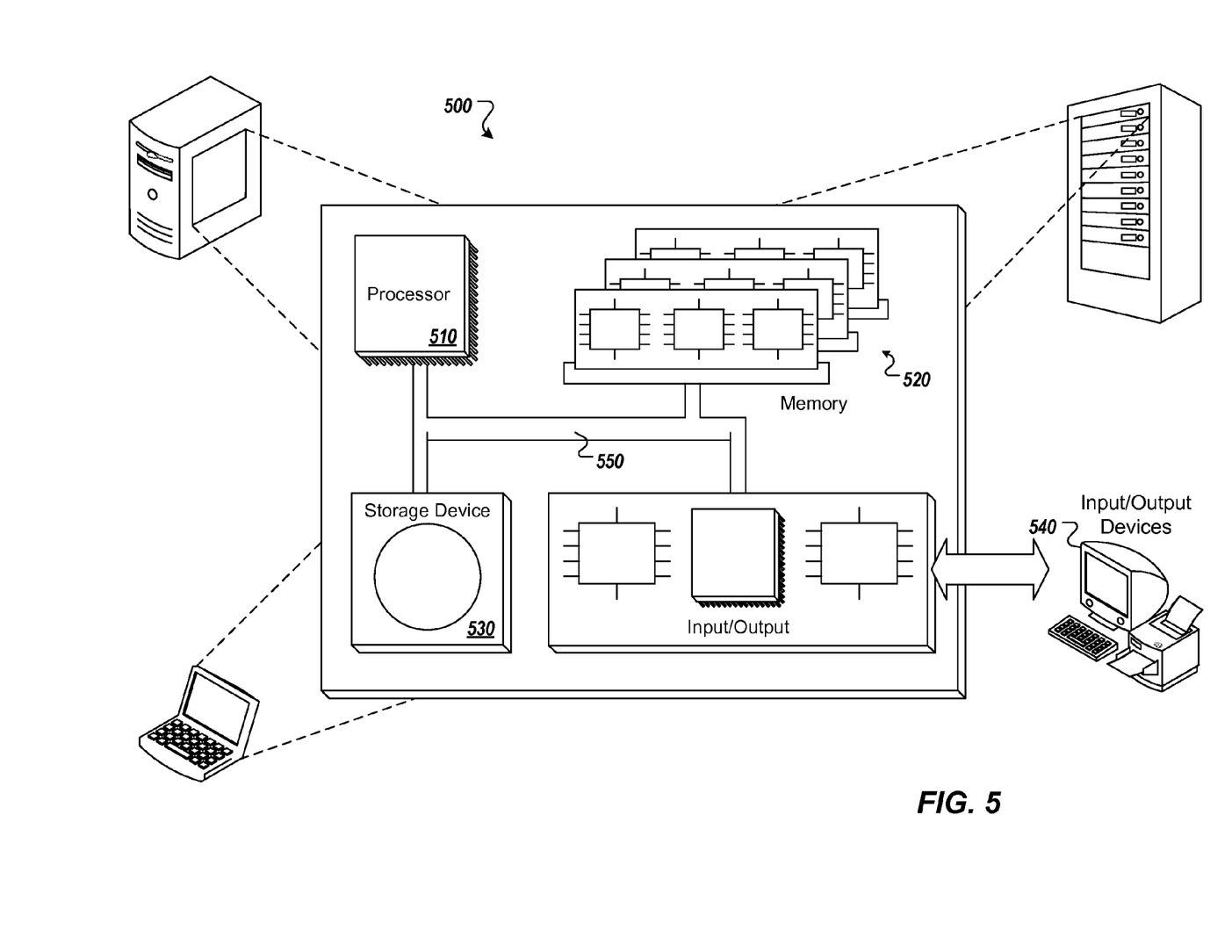
FIG. 5 is a schematic illustration of example computer systems that can be used to execute implementations of the present disclosure.

Referring now to FIG. 5, a schematic diagram of an example computing system 500 is provided. The system 500 can be used for the operations described in association with the implementations described herein. For example, the system 500 may be included in any or all of the server components discussed herein. The system 500 includes a processor 510, a memory 520, a storage device 530, and an input/output device 540. The components 510, 520, 530, 540 are interconnected using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530 to display graphical information for a user interface on the input/output device 540.

The memory 520 stores information within the system 500. In one implementation, the memory 520 is a computer-readable medium. In one implementation, the memory 520 is a volatile memory unit. In another implementation, the memory 520 is a non-volatile memory unit. The storage device 530 is capable of providing mass storage for the system 500. In one implementation, the storage device 530 is a computer-readable medium. In various different implementations, the storage device 530 may be a floppy disk device, a hard disk device, an optical disk device, or a tape device. The input/output device 540 provides input/output operations for the system 500. In one implementation, the input/output device 540 includes a keyboard and/or pointing device. In another implementation, the input/output device 540 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include (e.g., a LAN, a WAN), and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for encrypting data to provide encrypted data for storage in a database, the method being executed using one or more processors and comprising:
receiving, by at least one processor of a client-side computing device, an input set comprising a plaintext value that is to be encrypted to provide an encrypted value;
determining whether a first encrypted value corresponding to the plaintext value is stored in a search tree that is stored by the client-side computing device to generate a conditional selection between a deterministic encryption and a randomized encryption, the conditional selection comprising if the first encrypted value is not stored in the search tree, the encrypted value is provided using the deterministic encryption of the plaintext value, and if the first encrypted value is stored in the search tree, the encrypted value is provided using the randomized encryption of the plaintext value such that the encrypted value corresponding to the randomized encryption differs from the first encrypted value corresponding to the deterministic encryption;
updating the search tree to include a node comprising the plaintext value and the encrypted value; and
transmitting, by the client-side computing device, the encrypted value to a server-side computing device for storage of the encrypted value in the database.

2. The method of claim 1, wherein determining whether the plaintext value is stored in a search tree comprises:
comparing the plaintext value to one or more plaintext values in respective nodes of the search tree; and
performing binary traversal of the search tree based on whether the plaintext value is equal to a plaintext value of a respective node.

3. The method of claim 2, wherein binary traversal of the search tree is performed based on a first coin value requiring traversal in a first direction, and a second coin value requiring traversal in a second direction, coin values being randomly selected.

4. The method of claim 2, further comprising determining that a threshold depth has been achieved in the search tree, and in response, rebalancing the search tree.

5. The method of claim 1, further comprising compressing the search tree for storage in the client-side computing device.

6. The method of claim 1, wherein the plaintext value is encrypted using order-preserving encryption.

7. The method of claim 1, further comprising:
receiving, by the client-side computing device and from the server-side computing device, the encrypted value;
traversing the search tree to select the node from a plurality of nodes in the search tree based on the encrypted value; and
retrieving the plaintext value from the node.

8. A non-transitory computer-readable storage medium coupled to one or more processors and having instructions stored thereon which, when executed by the one or more processors, cause the one or more processors to perform operations for encrypting data to provide encrypted data for storage in a database, the operations comprising:

receiving, by at least one processor of a client-side computing device, an input set comprising a plaintext value that is to be encrypted to provide an encrypted value;

determining whether a first encrypted value corresponding to the plaintext value is stored in a search tree that is stored by the client-side computing device to generate a conditional selection between a deterministic encryption and a randomized encryption, the conditional selection comprising if the first encrypted value is not stored in the search tree, the encrypted value is provided using the deterministic encryption of the plaintext value, and if the first encrypted value is stored in the search tree, the encrypted value is provided using the randomized encryption of the plaintext value such that the encrypted value corresponding to the randomized encryption differs from the first encrypted value corresponding to the deterministic encryption;

updating the search tree to include a node comprising the plaintext value and the encrypted value; and transmitting, by the client-side computing device, the encrypted value to a server-side computing device for storage of the encrypted value in the database.

9. The computer-readable storage medium of claim 8, wherein determining whether the plaintext value is stored in the search tree comprises:

comparing the plaintext value to one or more plaintext values in respective nodes of the search tree; and performing binary traversal of the search tree based on whether the plaintext value is equal to the plaintext value of a respective node.

10. The computer-readable storage medium of claim 9, wherein binary traversal of the search tree is performed based on a first coin value requiring traversal in a first direction, and a second coin value requiring traversal in a second direction, coin values being randomly selected.

11. The computer-readable storage medium of claim 9, wherein operations further comprise determining that a threshold depth has been achieved in the search tree, and in response, rebalancing the search tree.

12. The computer-readable storage medium of claim 8, wherein operations further comprise compressing the search tree for storage in the client-side computing device.

13. The computer-readable storage medium of claim 8, wherein the plaintext value is encrypted using order-preserving encryption.

14. The computer-readable storage medium of claim 1, wherein operations further comprise:

receiving, by the client-side computing device and from the server-side computing device, the encrypted value;

traversing the search tree to select the node from a plurality of nodes in the search tree based on the encrypted value; and retrieving the plaintext value from the node.

15. A system, comprising:

a client-side computing device; and a computer-readable storage device coupled to the client-side computing device and having instructions stored thereon which, when executed by the computing device, cause the computing device to perform operations for encrypting data to provide encrypted data for storage in a database, the operations comprising:

receiving, by at least one processor of the client-side computing device, an input set comprising a plaintext value that is to be encrypted to provide an encrypted value;

determining whether a first encrypted value corresponding to the plaintext value is stored in a search tree that is stored by the client-side computing device to generate a conditional selection between a deterministic encryption and a randomized encryption, the conditional selection comprising if the first encrypted value is not stored in the search tree, the encrypted value is provided using the deterministic encryption of the plaintext value, and if the first encrypted value is stored in the search tree, the encrypted value is provided using the randomized encryption of the plaintext value such that the encrypted value corresponding to the randomized encryption differs from the first encrypted value corresponding to the deterministic encryption;

updating the search tree to include a node comprising the plaintext value and the encrypted value; and transmitting, by the client-side computing device, the encrypted value to a server-side computing device for storage of the encrypted value in the database.

16. The system of claim 15, wherein determining whether the plaintext value is stored in the search tree comprises:

comparing the plaintext value to one or more plaintext values in respective nodes of the search tree; and performing binary traversal of the search tree based on whether the plaintext value is equal to the plaintext value of a respective node.

17. The system of claim 16, wherein binary traversal of the search tree is performed based on a first coin value requiring traversal in a first direction, and a second coin value requiring traversal in a second direction, coin values being randomly selected.

18. The system of claim 16, wherein operations further comprise determining that a threshold depth has been achieved in the search tree, and in response, rebalancing the search tree.

19. The system of claim 15, wherein operations further comprise compressing the search tree for storage in the client-side computing device.

20. The system of claim 15, wherein the plaintext value is encrypted using order-preserving encryption.

* * * * *